Aug. 24, 1965  J. BERTELS  3,202,793
PROCESS AND MEMBER FOR JOINING BY WELDING
LIGHT METALS WITH STEEL
Filed May 10, 1962
2 Sheets-Sheet 1
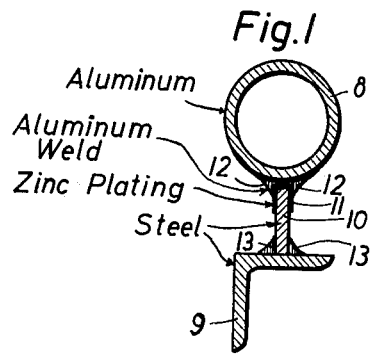
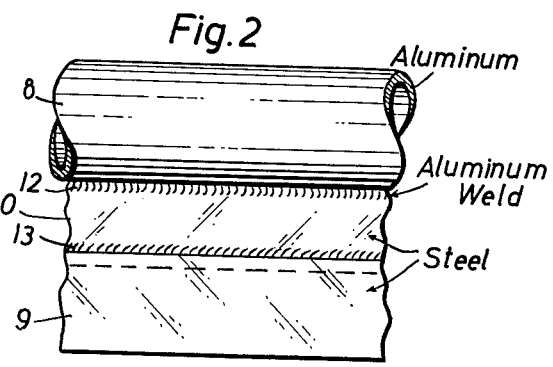
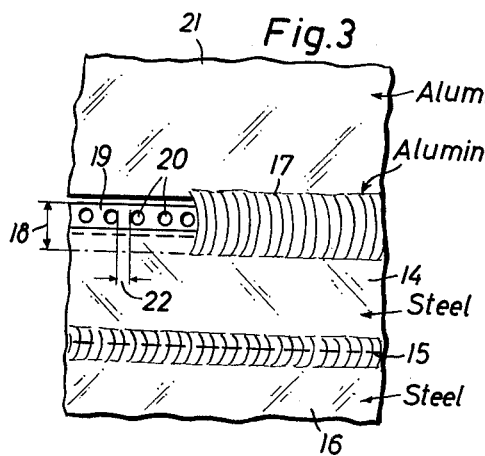
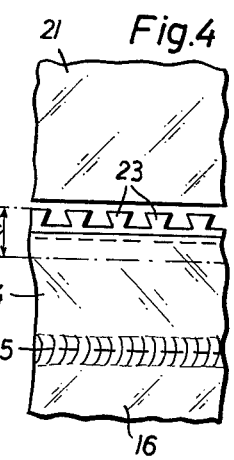
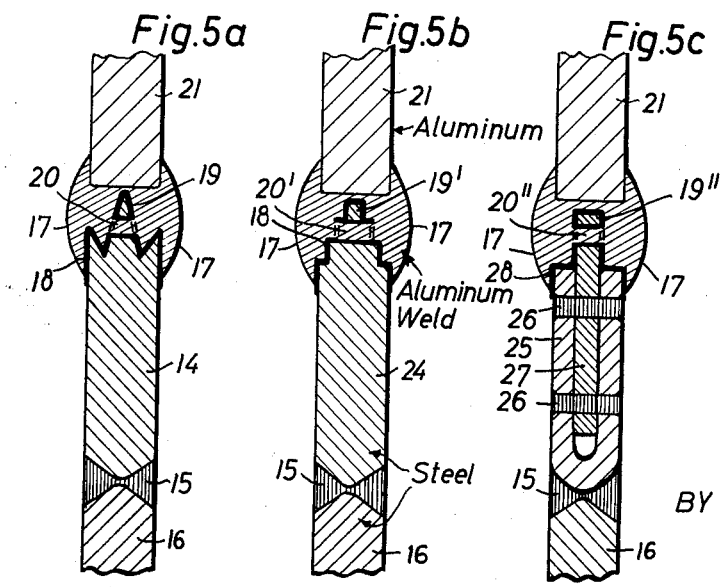
INVENTOR

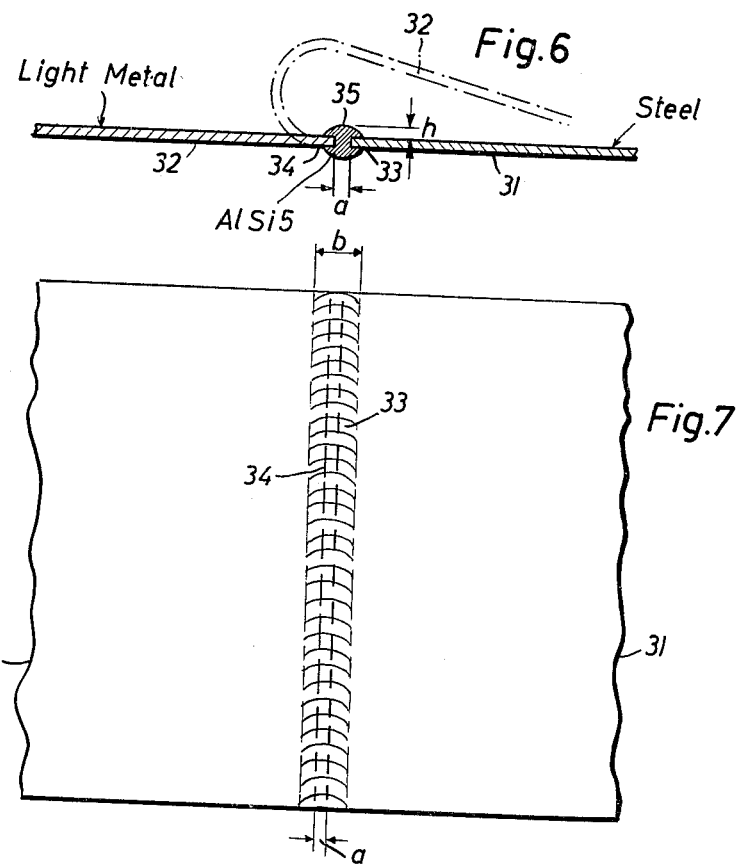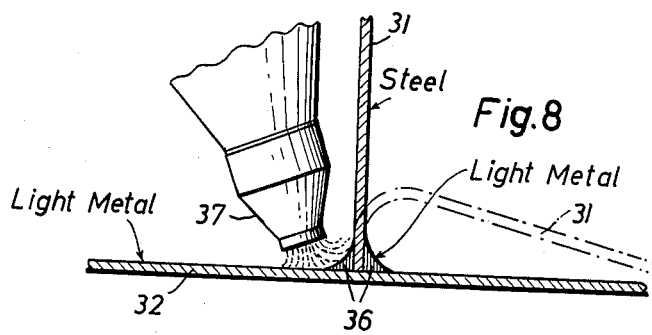

United States Patent Office
3,202,793
Patented Aug. 24, 1965

3,202,793
PROCESS AND MEMBER FOR JOINING BY WELDING LIGHT METALS WITH STEEL
Josef Bertels, Sternenstrasse 17, Berzdorf, near Brühl, Germany
Filed May 10, 1962, Ser. No. 193,831
Claims priority, application Germany, May 16, 1961, B 62,492; July 5, 1961, B 63,152
12 Claims. (Cl. 219—118)

The present invention relates to a process and a member for joining by welding light metals, e.g. aluminum, with steel.

Technology knows no process which would permit joining by welding an aluminum or light-metal part with a part made of steel. The present invention closes this gap in a very simple and effective way by plating the steel part with zinc at least in the connecting area. The two parts are then joined by gas-protected arc welding with the use of a bright aluminum or light-metal wire, the arc being maintained through the aluminum or light-metal part.

The joint made in this way may be considered as made by true arc welding because, first of all, no welding flux is being used and, secondly, bright welding wire can be utilized the composition of which corresponds to that of the light-metal part. The components of the welding wire apparently become alloyed with those of the parts to be joined together.

Aluminum, its alloys, as well as the materials commonly known under the collective term light metals are suitable to be subjected to the joining process according to the present invention. On the other hand, all kinds or iron and steel can be used which are capable of being zinc-plated. For instance, malleable cast iron which is obtained by annealing or tempering and which can be forged also belongs to the materials adapted to be joined with the light metals.

The characteristic features, objects and attendant advantages of interposing a steel strip when joining together an aluminum or light-metal part with a steel part will be readily appreciated as the same becomes better understood by reference to the following detailed description, when considered with the accompanying drawings which offer several examples of such connections, namely:

FIGS. 1 and 2 show an aluminum tube in welded joint with angle steel in respective end and side views;

FIGS. 3 and 4 are top views of an aluminum plate welded to a steel plate with two alternate detail solutions;

FIGS. 5a, 5b and 5c show cross-sections of welding joints according to the invention with the use of various shapes of steel strips;

FIGS. 6 and 7 show butt welding of a steel plate with a light-metal plate; and

FIG. 8 is the illustration of fillet welding of a steel plate with a light-metal plate.

FIGS. 1 and 2 show an aluminum tube designated 8 and an angle bar 9 of a normal rolled steel section. A steel strip 10 having a rectangular cross-section, likewise of a normal rolled material, is disposed between these parts. As shown in FIG. 1, the strip 10 is zinc-plated along its side walls and the edge facing the aluminum tube, as indicated by a heavy line 11. Along this upper edge the steel strip 10 is welded to the aluminum tube 8 by a two-sided aluminum fillet weld 12 according to the invention. Along its lower edge the steel strip is welded to the angle bar 9, likewise with a two-sided fillet weld 13. Inasmuch as at this point it is a case of welding together two steel parts, viz. 9 and 10, the fillet weld 13 is accomplished in a conventional manner, e.g. by arc welding.

The steel strip 10 can be produced, e.g., by rolling or drawing and may be easily adapted to the existing conditions by suitable profiling. For instance, for joining an aluminum plate with a steel plate a steel strip is suitable, as shown in respective top and cross-sectional views of FIGS. 3, 4 and 5a–5c. A strip 14 is, on one hand, joined with a steel plate 16 by means of an x-profiled weld 15 and, on the other, with an aluminum plate 21 by butt weld 17 made by gas-protected arc welding and having the shape of a horizontal I. The material of the weld may be similar to or identical with that of the plate 21, as will be explained somewhat later. The strip 14 is zinc-plated in its area 18 which will be covered by the I-shaped seam 17.

The strip 14 is made in such a way that it has a roughly W-shaped cross-section (see FIG. 5a) along its edge facing the aluminum plate 21, forming thereby a tongue 19. This type of cross-section is advantageous inasmuch as it assures that the strip 14 offers a large surface area to the welding seam.

In its tongue 19, the strip is provided with a row of apertures 20 (FIG. 3). These apertures have a sufficiently large diameter and are spaced so closely to each other that when the first bead of the seam 17 is applied to one side of the plates, a sufficiently large quantity of the protective gas, e.g. argon, can flow through said apertures to protect the zinc plating 18 and the aluminum plate 21 on the reverse side from oxidation. This assures specifically that the zinc layer on that side of the strip 14 remains completely intact and undamaged so that it is available for use when the second bead of the welding seam is applied. Thus a horizontal I-shaped seam 17 is obtained which is intimately joined on both sides with the steel strip.

Apertures 20 afford an additional advantage here, inasmuch as the beads on both sides of the seam 17 fuse together through them and thus contribute to a strong bond. The melding and subsequent fusing together of the beads from both sides of the strip 14 through apertures 20 brings about another advantage by assuring that the welded joint between the strip 14 and the aluminum plate 21 possesses a tensile strength of a high order. Under the influence of tensional forces the individual plugs filling the apertures 20 and joining together both beads of the seam 17 are subjected to shearing stresses; these stresses contribute to the ability of the welding seam 17 to withstand tensional forces of a high order.

Zinc plating of the steel strip 14 is preferably accomplished only after the latter has been provided with the apertures 20 to make sure that the welding material forms a strong bond with the strip also within the apertures.

The diameter of the apertures is primarily determined by the width of the area 18 of the steel strip 14 covered by the seam 17. If the width of this area measures, e.g., 10 mm. (millimeters), the diameter of the apertures is advantageously chosen at approximately 3–6 mm. If the width of the area 18 is larger, the diameter of the apertures may be correspondingly enlarged. On the other hand, it is advisable not to have apertures smaller than approximately 2 mm. even when the width of the area 18 is smaller than approximately 10 mm. The spacing 22 between the apertures 20 is advantageously chosen to approximately equal their diameters.

Thanks to the W-shaped edge cross-section of the steel strip 14, the contact surfaces between the steel strip and the seam 17 are increased. A further benefit of this form of cross-section may be seen in the fact that the strip 14 is relatively thin in the area of the apertures and the latter have only a limited length. Thus when the first welding seam is made on one side of the strip, the apertures present only a very limited obstacle to the passage of the protective gas. In this way it is assured that even with relatively heavy-gauge steel strip a sufficiently large amount of the protective gas can constantly pass through the apertures to the opposite side of the strip to guard both the zinc layer and the aluminum plate proper against oxidation. This assures a strong and homogeneous bond between the welding seams on each side and the steel strip.

Instead of apertures 20, tongues can be provided along the edge of the steel strip 14 facing the aluminum plate 21, defining recesses therebetween, as shown in the alternative of FIG. 4. In cases where the welded joint is subjected to tension, the recesses between the tongues 23 are tapering toward the edge to be joined, e.g., in the form of dove-tails, as shown in the drawing. Under the influence of tensional forces, shearing forces are created in the oblique sides of the grooves, thus imparting to the welded joint a greater tensile strength. When a tensile strength of a particularly high order is not of great importance, the grooves can also be given a rectangular cross-section, e.g., a square one, or one which widens toward the welded seam (not shown). As will be explained hereunder, both alternate solutions, viz. those of FIGS. 3 and 4, are applicable to any of the embodiments shown in FIGS. 5a, 5b and 5c.

In the embodiment shown in FIG. 5b a steel strip 24 is disposed between an aluminum plate 21 and a steel plate 16 instead of the strip 14 of the previous embodiment. Strip 24 differs from strip 14 only by having a tongue 19' which is offset in a step-like fashion in the zinc-plated area 18, so as to present an enlarged outer surface. The additional benefit namely that apertures 20' provided in the tongue 19' are relatively short and thus present a limited obstacle to the flow of the protective gas, is also afforded in this case.

It will be understood that tongue 19' of the second embodiment may also be provided with tongues and intermediate grooves instead of apertures 20', as illustrated in FIG. 4. FIGS. 5a–5c all illustrate the strip tongues provided with apertures, as appearing in the top view of FIG. 3, while, for the sake of clarity, no duplicate cross-sectional views are presented for the alternate solution of FIG. 4 where the tongues have tapered or dove-tailed connecting grooves.

A surface enlargement of the steel strip in the area 18 which is sufficient in many cases can also be obtained by having the strip bevelled in the form of a cutting edge in this area (not shown). In case of such bevelling it is particularly useful to provide notches in the bevel surface which is itself flat. These notches which can be easily made with a knurling or milling wheel provide an additional surface enlargement. This causes furthermore the bevel surfaces to be roughened and fissured and is beneficial inasmuch as it improves the adherence and enhances the tensile strength of the welded joint.

While the above-described steel strips are either rolled or drawn profiles, FIG. 5c shows a steel strip which has a U-shaped base, consisting in particular of a strip 25 bent into the shape of a U, and of a flat strip 27 attached between the shanks of the former by welding spots 26. Instead of spot welding, the flat strip 27 can be attached to strip 25 by some other means, e.g., by riveting. The width of the flat strip 27 is so chosen that it protrudes somewhat above the shanks of the plate strip 25 and is provided in this protruding part with a row of apertures 20". After the strip has been assembled, it is zinc-plated in the area 28 marked with a heavy line. In this way an easily manufactured composite strip 25, 27 is obtained, possessing the additional advantage of being shaped in a step-like fashion along the area 28 to be welded to the aluminum plate 21 and thus presents a large contact surface for the two-sided seam 17.

The various steel strips 14, 24 and 25, 27, respectively, according to FIGS. 5a to 5c, do not have to be of the same gauge as the plates 16 and 21 to be joined together, but can be either heavier or thinner. This is advantageous because of the strips of gauges corresponding to numerous plate thicknesses do not have to be kept in stock, but the connecting strip can be used with various gauges of plates.

When a light-metal or aluminum plate is directly joined to a steel plate, i.e. without the interposition of a steel strip, it is advisable to shape the steel plate edge as shown in FIGS. 5a or 5b and to provide it with apertures as per FIG. 3, especially in cases where high demands are made concerning the strength of the welded joint.

In the foregoing, the terms "light metal" and "aluminum" have been used without specifying either one of the materials to be joined or the material of which the weld is made. It will be clear to those skilled in the art that any light metal or alloy, with a varying proportion of appropriate constituting elements, can be used without departing from the scope of the present invention. The following examples, given by way of illustration and not of limitation, give more specific information as to the materials advantageously, but not exclusively, used in the process according to the invention.

The invention will now be more fully explained in a number of examples, but it should be understood that these are given by way of illustration and not of limitation and that many changes in the details can be made without departing from the spirit of the invention.

EXAMPLE I

*Butt welding of a steel plate with a light-metal plate*
(FIGS. 6 and 7)

A steel plate (boiler plate) 31 of 2 mm. thickness and approximate 100 x 100 mm. size has been zinc-plated by the hot-galvanizing method. It was to be joined with a light-metal plate 32 having equal dimensions and thickness and made of the allow AlMg3 (semi-hard). The plate 31 was disposed with its zinc-plated edge 33 parallel to edge 34 of the light-metal plate 32, with a spacing $a$ of approximately 2 mm. Joining of the two plates was accomplished by gas-protected arc welding according to the so-called "Argonarc" process. The welding torch was equipped with a nozzle No. 6 and the welding transformer set at approximately 70 amps. AlSi5 wire of 3 mm. diameter was used for welding. Consumption of argon gas was a constant six liters per minute. The nozzle was guided along the seam 35 in such a way that the arc was formed with the light-metal plate 32 only. The width $b$ of the welding seam 35 measured approximately 8 mm. and its height $h$ on either side approximately 1 mm. The appearance of the welding seam face approximated that of a conventional arc weld.

After a conventional cooling period, the plates 31, 32 welded together were subjected to a bending test and bent to approximately 180°, as represented by the dot-dash lines of plate 32 in FIG. 6. No fractures, cracks or signs of separation could be found.

The alloy grades or designations AlMg3 and AlSi5 mentioned in the preceding example are taken from the German Industrial Standards (termed DIN) for aluminum alloys. The former, AlMg3 designates an aluminum magnesium alloy containing about 3% magnesium. Such an alloy is particularly suitable for structural elements which are to be exposed to sea water. The latter, AlSi5 is understood to be an aluminum silicon alloy containing about 5% silicon. Such an alloy is used especially for the production of aluminum welding wires.

EXAMPLE II

*Fillet welding of a steel plate with a light metal plate*
(FIG. 8)

The fillet welding was accomplished with plates 31 and 32 having the same respective characteristics and dimensions as those used in the first example. The hot-galvanized steel or boiler plate 31 was disposed at right angles to the center line of the light-metal plate 32. The plates were joined on both sides by means of a light fillet weld 36, each having a radius of approximately 8 mm. The welding procedure itself was accomplished in a manner analogous to the one described in Example I, and is shown in FIG. 8. In this schematic illustration the welding torch 37 is shown in the position in which the arc was started. For a simpler illustration, the conventional structure used in the welding process (e.g., electrical power source or leads, gas supply or protective hood) has been omitted.

During the welding procedure proper the torch was moved closer to the abutment on each side of the boiler plate 31, but was always guided along the plate at such a distance therefrom that the arc was maintained with the light-metal plate 32 only. The fillet weld made in such a manner corresponded in appearance to a conventional light-metal welding seam.

After a suitable cooling period, half of the light-metal plate 32 was clamped and subsequently the steel plate 31 was bent by about 90° as shown by the dot-dash lines in FIG. 8. No fractures, cracks or signs of separation of the welding seam could be found in this case either.

In the foregoing two examples, the direct joining of steel and light-metal members has been described. It will be understood, however, that the same process may be used and similar conditions will prevail if a steel strip is inserted between the aluminum or light-metal part and the steel part to be joined with it. As has been described in the foregoing, this strip is zinc-plated at least along its edge facing the aluminum or light-metal part and is then welded to the latter, being subsequently joined with its other edge to the steel part, preferably also by welding. In this case only the steel strip has to be zinc-plated and not to the steel part itself. This is advantageous inasmuch as in many cases the steel strip can be plated more easily and with a lower expenditure of zinc than the steel part.

When joining the steel strip to the aluminum or light-metal part on both sides by means of a welding seam, the steel strip is preferably shaped in such a way that it has a narrow rectangular cross-section and is provided with apertures or recesses along the edge to be joined to the light-metal part, as has been discussed in connection with the embodiments of FIGS. 3, 4 and 5a–5c.

It should be understood, of course, that the foregoing disclosure relates only to preferred embodiments of the invention and that it is intended to cover all changes and modifications of the examples described which do not constitute departures from the spirit and scope of the invention as set forth in the appended claims.

What is claimed is:

1. Process for joining by welding a steel part with a light-metal part, comprising the steps of zinc-plating said steel part at least in a portion to be joined with a portion of said light-metal part, arc-welding said portions with a welding material substantially similar in composition to that of said light-metal part, while maintaining the arc against said light-metal part without touching said steel part therewith, shaping said portion of the steel part into an edge narrowing toward said light-metal part, and providing recesses in said edge.

2. Process according to claim 1, further comprising the step of cutting ridges into said steel-part edge for increasing its surface to be welded.

3. Process according to claim 1, wherein said recesses are provided in the shape of substantially regularly spaced-apart holes.

4. Process according to claim 1, wherein said recesses are dovetail-shaped and taper toward said portion of the light-metal part.

5. Process according to claim 1, further comprising the step of forming notches in said portion of the steel part for improving the adherence of the welding seam.

6. In a joint between a ferrous metal part and a non-ferrous light-metal part, the improvement comprising a relatively thin zinc coating on a portion of said ferrous part, and a welding seam applied between said zinc coating and said light-metal part and consisting of a material substantially similar to that of said light-metal part, wherein the coated portion of said ferrous part is narrowingly shaped toward said light-metal part, and wherein said coated portion is provided with recesses in the shape of regularly spaced-apart apertures.

7. In a joint between a ferrous metal part and a non-ferrous light-metal part, the improvement comprising a relatively thin zinc coating on a portion of said ferrous part, and a welding seam applied between said zinc coating and said light-metal part and consisting of a material substantially similar to that of said light-metal part, wherein the coated portion of said ferrous part is narrowingly shaped toward said light-metal part, and wherein said narrowing part has dovetail-shaped recesses and tapers toward said light-metal part.

8. A prefabricated joining member for dissimilar welded joined between a ferrous metal part and a non-ferrous light-metal part, said member consisting of a ferrous metal having a relatively thin zinc coating thereon, a portion of said ferrous metal being shaped into a narrowing peripheral edge provided with recesses.

9. A joining member according to claim 8, wherein said edge is provided with ridges for increasing the surface thereof for the subsequent welding to said light-metal part.

10. A joining member according to claim 8, wherein said recesses are provided in the shape of regularly spaced-apart apertures.

11. A joining member according to claim 8, wherein said recesses are dovetail-shaped and taper outwardly.

12. A joining member according to claim 8, wherein said portion of the ferrous part is provided with notches for improving the adherence of a welding seam added subsequently thereto.

References Cited by the Examiner

UNITED STATES PATENTS

| | | | |
|---|---|---|---|
| 2,716,690 | 8/55 | Lund | 219—137 |
| 2,761,047 | 8/56 | Meredith | 219—118 |
| 2,790,656 | 4/57 | Cook | 287—20.2 |
| 2,815,436 | 12/57 | Bland | 219—74 |

RICHARD M. WOOD, *Primary Examiner.*